United States Patent Office 3,461,515
Patented Aug. 19, 1969

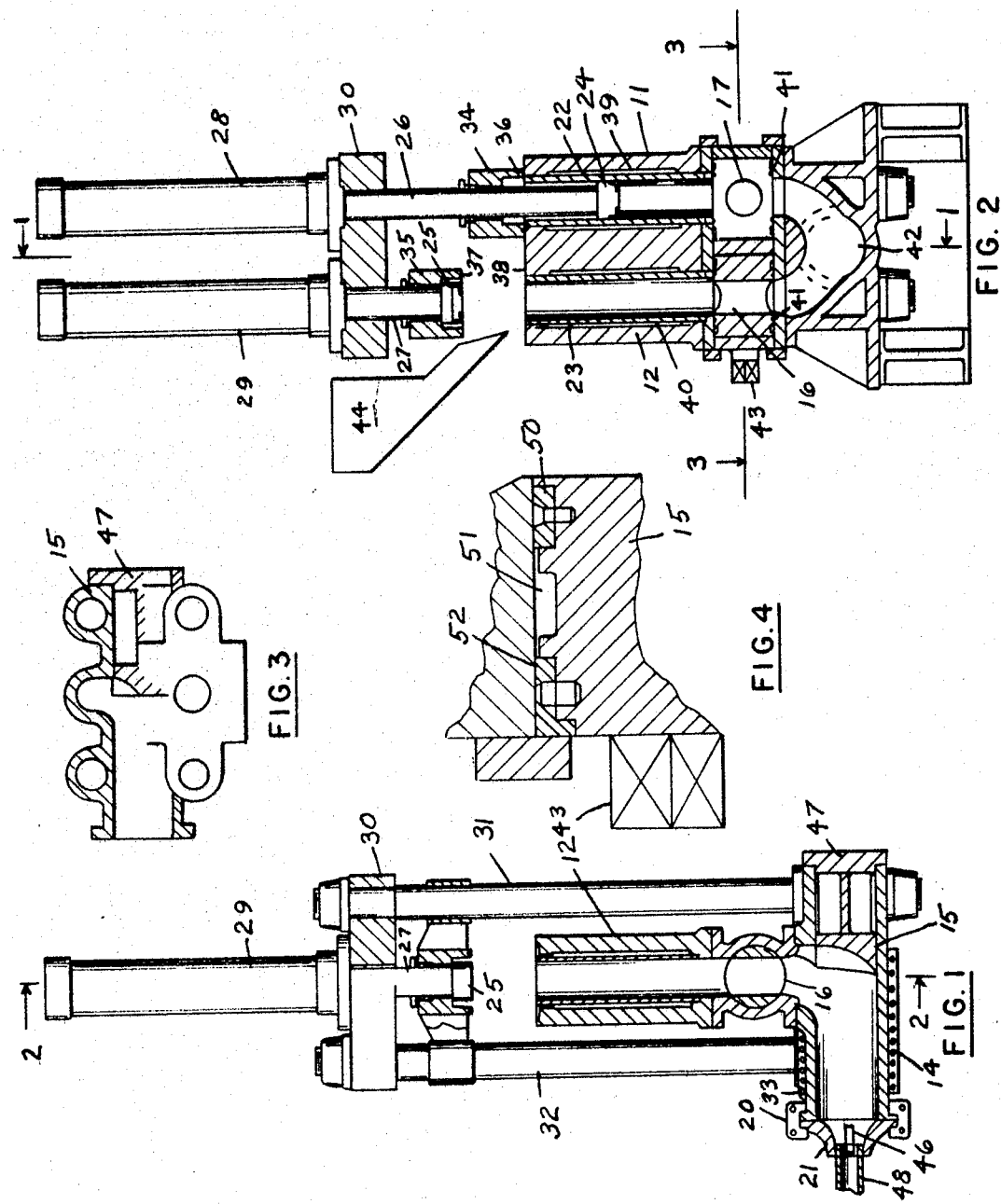

3,461,515
CONTINUOUS EXTRUSION MACHINE
Heinz Cornberg, Erie, Pa., assignor to Erie Foundry Company, Erie, Pa., a corporation of Pennsylvania
Filed Oct. 10, 1966, Ser. No. 585,639
Int. Cl. B28b 3/24
U.S. Cl. 25—15                    2 Claims

ABSTRACT OF THE DISCLOSURE

This invention relates to an extrusion machine made up of two cylinders with a piston in each cylinder. The pistons can be completely retracted from the cylinders so that plastic material can be fed selectively into either cylinder. The cylinders are connected through a plug valve to an extrusion die. The plug valve has two ports; one port can connect or disconnect one of the cylinders from the passage to the extrusion die, the other port can connect or disconnect the other cylinder from the passage to the extrusion die. The ports in the plug valve are arranged ninety degrees from each other so that one port is closed when the other is open. The ports are both partly open simultaneously so that the plastic material is never completely shut off or completely connected from both cylinders at the same time. A synchronizing mechanism is provided connecting the plug valve to the actuating mechanism for the cylinders so that the proper port in the plug valve is always connected to the cylinder feeding material at a particular time.

---

The continuous carbon extrusion press disclosed herein has at least two vertically extending extrusion containers which, in the preferred embodiment, are ten inches in diameter and operate at a pressure of, for example, 5000 pounds per square inch with a nominal capacity of 200 tons. In the preferred embodiment, the two containers are connected to a twelve inch diameter mud cylinder by means of a valve having a rotatable plug. The plug of the valve is ported in such a manner that when one of the containers is loaded and prepared for compacting or tamping, the port to that valve is in a blocked position while the port at the other container is in an extrusion position.

The mud cylinder is arranged in a horizontal position. The die end of the mud cylinder is of conventional construction and provided with the usual split clamps for extrusion tool mounting. The other end of the mud cylinder is provided with a removable plug. This plug can be provided with various components to serve different desirable functions. The plug can be removed for maintenance of the mud cylinder. The plug can also be used for mounting a core rod to permit the extrusion of hollow tubing and shape commonly used in the nuclear and missile field.

The two containers are used alternately for loading and extrusion. One container is alternately loading and tamping while the other is used for extrusion.

After the extrusion function is completed, the container action will be reversed and the loaded and the tamped container is ready for extrusion while the other container will now be used for loading and tamping.

The valve alternately diverts the extrusion flow from one of the extrusion containers into a mud cylinder as required, while the container being tamped will be blocked off. This action will then be reversed and the other extrusion container connected to the mud cylinder.

A continuous flow of carbon through the valve into the mud cylinder and out of the die is achieved by the introduction of common control pressure on both cylinders prior to the final extrusion action on one container. Both containers will automatically exrtude at this time at a variable extrusion speed which in turn is governed by the exposed portion of porting of the rotating plug valve. As the porting on one side of the container closes, the porting on the blocked off side of the container will open in the exact proportion, thus retaining the same flow of material through the valve plug.

It is, accordingly, an object of the present invention to provide an improved extrusion container arrangement.

Another object of the invention is to provide a continuous extrusion press which is simple in construction, economical to manufacture, and simple and efficient to use.

Still another object of the invention is to provide an extrusion press having at least two containers in combination with a ported valve wherein one container will extrude while the other is being loaded and tamped and the action will then be reversed so that the first mentioned container will be loaded and tamped while the second container will be extruding.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a longitudinal cross sectional view of an extrusion machine according to the invention taken on line 1—1 of FIG. 2;

FIG. 2 is a cross sectional view of the machine taken on line 2—2 of FIG. 1;

FIG. 3 is a longitudinal cross sectional view taken on line 3—3 of FIG. 2; and

FIG. 4 is a partial cross sectional view of a part of the valve as shown in FIG. 2.

Now with more particular reference to the drawing, the machine is basically made up of the two extrusion containers 11 and 12 connected to the mud cylinder 14 by means of a plug valve 15. The plug valve has a first port 16 and a second port 17 disposed in the rotating plug at right angles to each other. The mud cylinder has its die end provided with a split clamp 20 which is suitable for connecting it to extrusion tools indicated at 21.

Each of the containers 11 and 12 has liners 22 and 23 which slidably receive pistons 24 and 25 which are connected to piston rods 26 and 27, respectively. The piston rods are attached to the pistons reciprocably supported in the control cylinders 28 and 29. The control cylinders 28 and 29 are supported on a head 30. The head 30 is supported on the valve and mud cylinder by means of the columns 31 and 32. The mud cylinder has a heating element 33 disposed around it to heat the carbon being extruded.

A vacuum seal is provided at the upper end of the cylinders when the caps 34 and 35 are in turn lowered. These caps have O-rings 36 and 37 on their lower ends which make sealing engagement with the surface 38 on the upper end of the extrusion containers when a vacuum is applied thereto.

The spaces 39 and 40 between the liners and the containers 11 and 12, respectively, may receive a heating medium.

The valve plug is provided with peripheral grooves which receive the O-ring seals indicated at 41 and the ports 16 and 17 communicate with the inside of the mud cylinder indicated at 42. An operating member 43 will be connected to a suitable synchronizing circuit which will be connected from the operating member 43 to the hydraulic controls for the cylinders 28 and 29.

A hopper 44 is provided for loading material into the extrusion containers.

During operation, when the machine is idle, the piston 25 will be in the position shown with the cap 35 raised. Material will be fed from hopper 44 into the liner 23 to fill the liner. The controls will then be actuated and the piston 25 will descend, driving the material in the liner 23 through the port 16 and out the mud cylinder. During this operation, while the piston 25 is descending, the piston 24 will rise so that it will be in a position similar to that shown in FIG. 2 for the piston 25. At this time, material will be charged into the liner 22. Then the piston 25 will be retracted and piston 24 will descend and, at the same time, valve 15 will be rotated so that the port 17 connects the mud cylinder to the inside of the liner 22. Then as the piston 24 continues to descend, the material in the liner 22 will be driven into the mud cylinder and extruded through the die member. As the valve plug rotates, one port closes while the other opens so there will be a constant flow.

A mandrel 46 may be attached to the plug 47 as indicated and this mandrel will cause the material to be extruded in tube form through the outlet tube 48 in a manner familiar to those skilled in the art. The plug 47 may also be removed for servicing the mud cylinder.

A continuous extrusion machine with an extrusion chamber arrangement consisting of two or more extrusion containers of in this case 8" diameter and larger 12" diameter mud cylinder. The parts of this arrangement are connected by a plug valve, which connects either one of the extrusion containers to the mud cylinder. In this system, the container cylinder is used to squeeze the material under high compression force through the valve into the larger mud cylinder which, in turn, acts as a mixing chamber to insure the proper blending of the different charges without creating seams or parting lines on the finished product when it is extruded out of the die at the end of the mud cylinder.

This mixing process is improved by the L-shaped arrangement of the parts. The larger size mud cylinder also acts as hydraulic intensifier by increasing the actual extrusion force acting on the die. The material acting as hydraulic fluid is subject to, in this case, 5000 lbs. pressure in the extrusion container and by hydraulic action this 5000 lbs. pressure passes through the connecting valve, is also present in the larger mud cylinder. This system makes it possible to use small control cylinders to create large extrusion forces in the mud cylinder and, in this manner, extrude through a much larger die area as commonly possible with a small force.

Also the machine disclosed, make up the combination of the continuous extrusion process, the force intensification due to different diameters of extrusion containers and mud cylinder and the blending of the different charges in the mud cylinder due to the L-shape of the arrangement which eliminates seams in the final product, is a novel approach to extrude large cross-sectional parts of practically unlimited length out of a relatively small press which is economical to manufacture and simple to use.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A continuous extrusion machine comprising
   a mud cylinder,
   said mud cylinder having its outlet end having means to connect it to an extrusion tool,
   a plug valve having a plug,
   said plug being rotatably mounted in said valve and having a first port and a second port radially extending through said plug and disposed at right angles to each other,
   a first extrusion container and a second extrusion container,
   said extrusion containers being attached to said valve,
   said first extrusion container communicating with said mud cylinder by way of said first port when said plug is in a first position,
   said second extrusion container communicating with said mud cylinder by way of said second port when said plug is in a second position,
   said plug obstructing communication of said first container and said second container with said mud cylinder when said plug is in said second position and in said first position, respectively,
   said plug progressively connecting one of said extrusion containers and disconnecting the other of said extrusion containers from said mud cylinder when it is moved from said first position to said second position and from said second position to said first position,
   a first piston slidably receievd in said first extrusion container,
   a second piston received in said second extrusion container,
   and control means to reciprocate said first piston and said second piston and to move said plug from said first position to said second position whereby said plug connects said first extrusion container to said mud cylinder when said first piston is moving toward said mud cylinder and said plug connects said second container to said mud cylinder when said second container is moving toward said mud cylinder.

2. The machine recited in claim 1 wherein
   a cap is supported on each said first piston and said second piston,
   and said pistons each move completely out of the upper end of said extrusion containers on their upward stroke whereby material may be charged into the open ends of said containers.

References Cited
UNITED STATES PATENTS

| | | |
|---|---|---|
| 2,366,417 | 1/1945 | MacMillin. |
| 2,404,406 | 7/1946 | Roddy. |
| 2,443,586 | 6/1948 | Stuart. |
| 2,620,922 | 12/1952 | Deutsch. |
| 2,643,620 | 6/1953 | Miller. |
| 3,137,034 | 6/1964 | Adams. |
| 3,158,901 | 12/1964 | Westover. |
| 3,166,793 | 1/1965 | Montpeat. |
| 3,169,275 | 2/1965 | Compton et al. |
| 3,272,901 | 9/1966 | Sims. |
| 2,253,810 | 8/1941 | Poux. |
| 2,367,204 | 1/1945 | Cousino. |

FOREIGN PATENTS

| | | |
|---|---|---|
| 1,195,860 | 3/1959 | France. |

WILLIAM J. STEPHENSON, Primary Examiner

U.S. Cl. X.R.

18—12, 30